United States Patent [19]

Meyer

[11] Patent Number: 4,972,603
[45] Date of Patent: Nov. 27, 1990

[54] LINEAR MEASURING DEVICE

[76] Inventor: Hans Meyer, 24, rue du Bugnon, 1020 Renens, Switzerland

[21] Appl. No.: 343,407

[22] Filed: Apr. 19, 1989

[30] Foreign Application Priority Data

Jun. 7, 1988 [CH] Switzerland ............................ 2173/88

[51] Int. Cl.⁵ .............................. G01B 3/20; G01B 5/08
[52] U.S. Cl. ........................................ 33/810; 33/784; 33/811
[58] Field of Search ................. 33/810, 811, 812, 783, 33/784, 795, 796, 806, 823, 824

[56] References Cited

U.S. PATENT DOCUMENTS

| 976,559 | 11/1910 | Dittrich et al. | 33/810 |
|---|---|---|---|
| 1,425,027 | 8/1922 | Lustrik | 33/823 |
| 1,726,193 | 8/1929 | Ross | 33/812 |
| 3,041,732 | 7/1962 | Christner | 33/810 |
| 3,145,475 | 8/1964 | Alford | 33/812 |
| 3,449,052 | 6/1969 | Rankin | 33/810 |
| 3,727,471 | 4/1973 | Botos | 33/811 |
| 4,244,107 | 1/1981 | Rea | 33/811 |
| 4,322,888 | 4/1982 | Garzone | 33/795 |
| 4,375,722 | 3/1983 | Nishikata et al. | 33/810 |
| 4,612,656 | 9/1986 | Suzuki et al. | 33/784 |

FOREIGN PATENT DOCUMENTS

| 0077521 | 5/1949 | Czechoslovakia | 33/810 |
|---|---|---|---|
| 0053062 | 6/1982 | European Pat. Off. | |
| 0351160 | 3/1922 | Fed. Rep. of Germany | 33/810 |
| 0197809 | 9/1978 | Fed. Rep. of Germany | 33/810 |
| 2942822 | 5/1981 | Fed. Rep. of Germany | |
| 2238396 | 2/1975 | France | |
| 0060301 | 5/1981 | Japan | 33/810 |
| 472585 | 6/1969 | Switzerland | |
| 632903 | 12/1949 | United Kingdom | |
| WO88/02471 | 4/1988 | World Int. Prop. O. | |

Primary Examiner—William A. Cuchlinski, Jr.
Assistant Examiner—Christopher W. Fulton
Attorney, Agent, or Firm—Young & Thompson

[57] ABSTRACT

The linear measuring device comprises two rails (2 and 3) arranged in parallel to each other and joined together, a measuring head (15) with measurement pickup, an adjusting element (14) connected with the measuring head (15) by way of a spring coupling, this adjusting element being fixedly attachable to the rail (2) by clamping, an adjustable counter stop element (11), and two supporting elements (12 and 13) displaceably arranged on the rail (3), these supporting elements being freely guidable past the elements mounted on the rail (3) over the entire length of the device. Thereby, the measuring device can be adapted to any posed measuring task in a simple way.

21 Claims, 2 Drawing Sheets

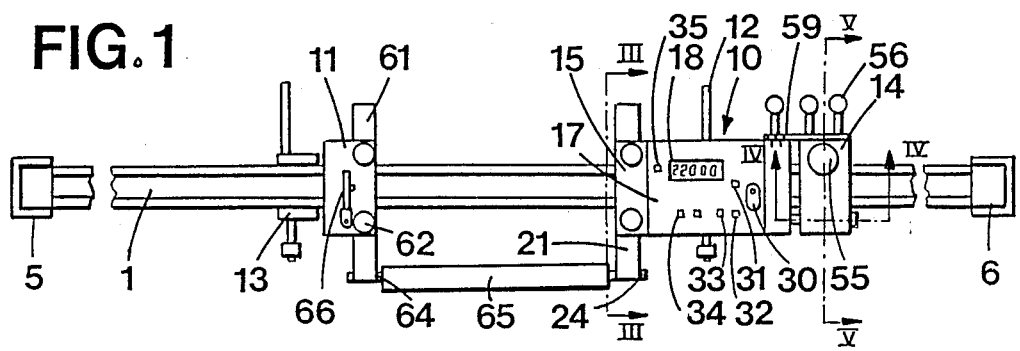
FIG. 1
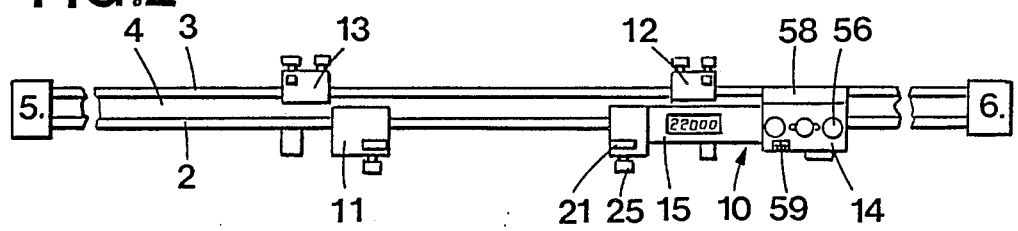
FIG. 2
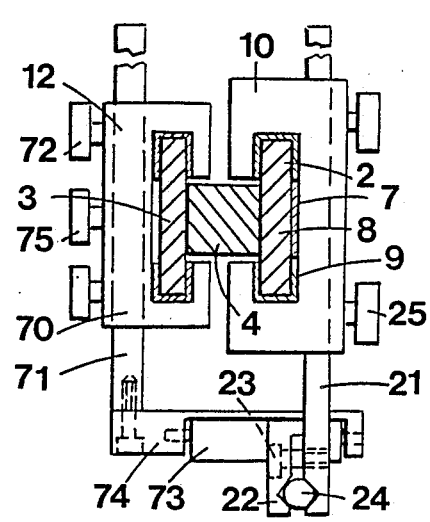
FIG. 3
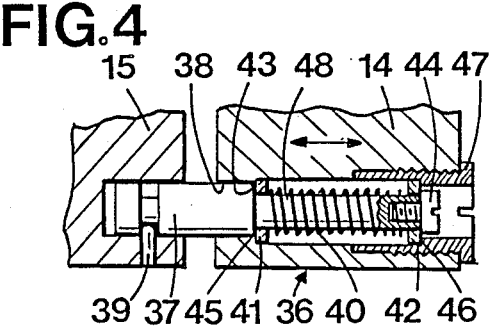
FIG. 4
FIG. 5

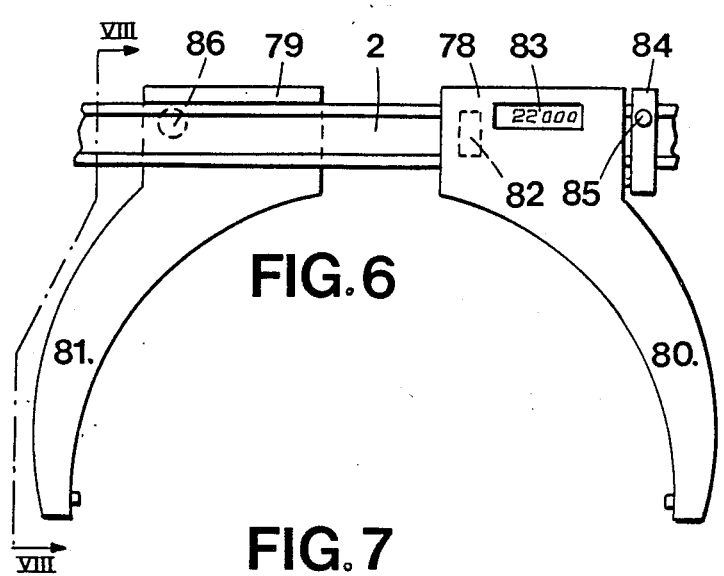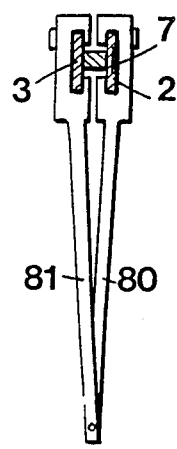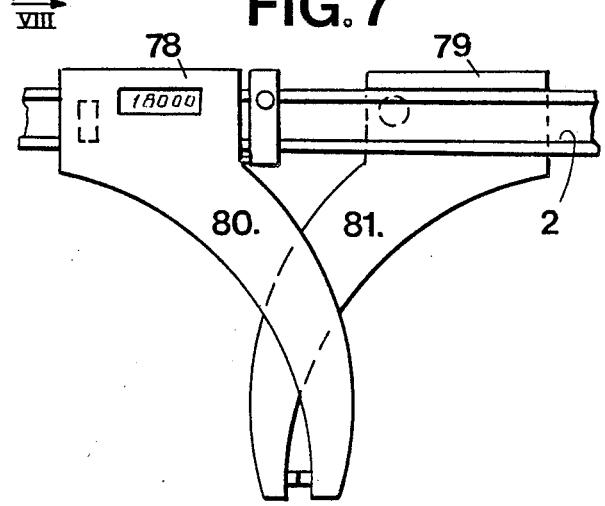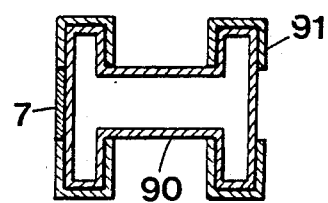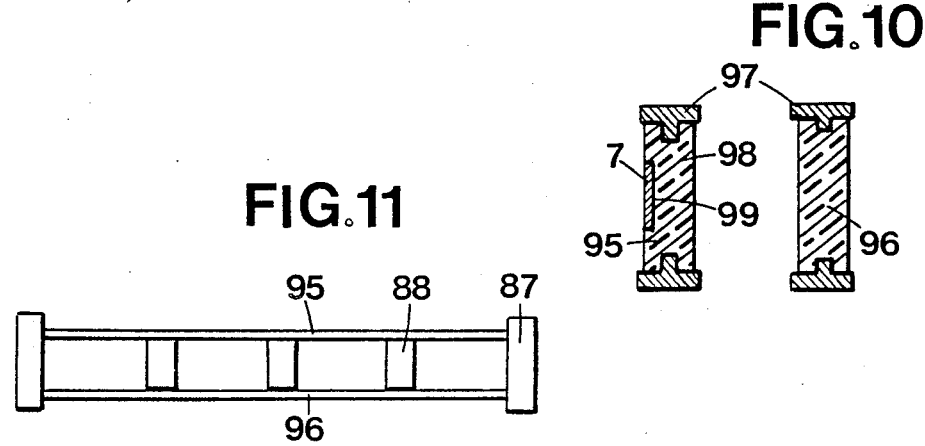

LINEAR MEASURING DEVICE

The invention relates to a linear measuring device of the type of a caliper rule, with elements displaceably arranged on a rail.

An important condition in linear measuring instruments, especially for great lengths, is that they can be supported either on the object to be measured or, alternatively, outside of this object in order to achieve the posed measuring task. In conventional devices, there is the possibility of attaching supporting elements at the ends; however, this is adequate for only a limited number of measuring problems. It is an object of the invention to overcome this drawback by providing supporting members at an arbitrary location of the linear measuring device so that they can be displaced and affixed by clamping without thereby interfering with the function of the actual measuring elements (feelers etc.). Thereby, the range of application of such devices is decisively broadened. For certain measuring problems, especially measurements of large outer diameters, it is also necessary to employ measuring elements equipped with long and large measuring jaws. In such arrangement, a very long rail is required on which the measuring elements are shifted. Such a rail is, however, subject to a certain sag which is highly deleterious to the measuring accuracy. Furthermore, in the majority of large measuring jaws, e.g. measuring jaws shaped like a quarter circle, it is impossible to measure small lengths at the same time or to zero the device by touching the measuring stops.

The invention has the purpose of also remedying these disadvantages and, to this end, is characterized in that the linear measuring device comprises at least two rails extending in parallel to each other, on which rails the elements can be shifted substantially over the entire length of the device, the elements being designed in such a way that elements arranged to be displaceable on different rails can be guided in opposite directions past one another at least in part.

Thereby, the device affords the advantage of being adaptable to any posed measuring problem in a simple and rapid manner, and of increasing the measuring accuracy on account of higher rigidity.

The two rails are advantageously joined over their entire length by a connecting piece and are of rectangular configuration. This results in a simple structure and leads to an improvement in rigidity.

The rails can be built advantageously as a composite structure, consisting of a core and of guide elements attached to this core. This permits economical production and, particularly in case of relatively large measuring devices, affords a considerable reduction in weight and accordingly improved measuring properties.

A preferred embodiment is characterized in that the elements consist of measuring elements and supporting elements, the measuring elements being displaceably arranged on a measuring rail and comprising a measuring head with feeler and measurement pickup and a counter stop element with feeler that can be clamped fixedly onto the measuring rail; and the supporting elements being arranged so that they can be displaced and fixedly clamped in place substantially over the entire length of a supporting rail.

This arrangement permits a maximally wide range of application with precise measurement.

Another advantageous embodiment exhibits two measuring elements provided with jaws, one of the measuring elements being equipped with a measurement pickup and being located to be displaceable on a first rail carrying a scale, whereas the second measuring element serving as the counter stop element is arranged on a second rail to be displaceable and fixable by clamping.

It is thereby possible to measure large diameters and relatively small lengths by means of one and the same device, and to zeroize the device even if, for example, measuring jaws of quarter circle shape are employed.

Further advantageous embodiments can be seen from the features of the dependent claims and the following description elaborating on one embodiment and several versions with reference to the appended drawings wherein:

FIG. 1 is a front view of the embodiment;

FIG. 2 is a plan view of this embodiment from above;

FIG. 3 is a section through FIG. 1 along plane III—III;

FIG. 4 is a section through FIG. 1 along plane IV—IV;

FIG. 5 is a partial section through FIG. 1 along plane V—V;

FIG. 6 is a frontal view of a modification;

FIG. 7 shows the modification of FIG. 6 illustrated in a different position of the feeler members;

FIG. 8 is a cross section along plane VIII—VIII in FIG. 6;

FIGS. 9 and 10 are cross sections through the rails of two further modifications;

FIG. 11 shows a top view of the rails illustrated in FIG. 10.

The first embodiment illustrated in FIGS. 1–5 comprises a crossbeam 1 exhibiting two rails 2 and 3 arranged in parallel to each other, these rails being joined by way of a continuously extending central web 4. Measuring elements 10 and 11 are displaceably arranged on one rail 2 which can be denoted as the measuring rail, while the other rail 3 carries, in its function as a supporting rail, displaceable supporting elements 12 and 13. End pieces 5 and 6 mounted on the crossbeam 1 on both sides prevent falling out of the elements 10-13. Both rails 2 and 3 exhibit rectangular cross section. The measuring rail 2 is equipped with a scale 7 (FIG. 3).

In order to keep the weight of the measuring device to a minimum, the rails are produced in light-weight construction with a core 8 of a lightweight material, e.g. a fiber-reinforced synthetic resin, and with the running surfaces 9 being of hardened steel.

The measuring elements 10 and 11 arranged on the measuring rail consist of an adjustable counter stop element 11 and a bipartite measuring element 10 exhibiting a measuring head 15 and an adjusting element 14 coupled with the latter. A capacitive pickup 17 arranged on the measuring head 15 scans the scale 7 located on the rail 2. The thus-obtained signals are processed by a circuit, not shown in detail, and displayed in the window 18 (FIG. 1). Capacitive measuring systems and their electronic circuits for indicating the relative position of measuring head and scale are disclosed in greater detail, for example, in EP 0,053,091, EP 0,227,591, and EP 0,245,199. Such measuring systems are advantageously equipped with a battery 30, an on/-off switch 31, a zero key 32 for freely selectable zeroing, a maximum value key 33, value preselection keys 34, and an mm/inch conversion 35.

A feeler 21 is vertically adjustably housed in the measuring head 15 and is secured by screws 25. The feeler carries at its lower end a tracer pin 24 fastened by means of an adapting member 22 and a screw 23. The measuring head 15 is connected to the adjusting element 14 by way of a spring coupling 36. This spring coupling 36 comprises a pin 37 mounted to be longitudinally displaceable in a recess 38 of the adjusting element 14 and of the measuring head 15. A peg 39 permits securement of the pin 37 in the measuring head 15. A coil spring 40 surrounds a tapered portion 48 of the pin 37 and is supported, via rings 41 and 42, on the one hand, against a projection 43 of the pin 37 and, on the other hand, against an adjusting screw 44 mounted to the pin end. The ring 41 furthermore rests on a projection 45 of the recess 38 while the ring 42 cooperates with a projection 46 of a hollow screw 47. The coil spring 40 is thus mounted under a certain pretensioning between the two rings 41 and 42 whereby the measuring head 15 can be shifted with respect to the adjusting member 14 into opposite directions against the spring force.

As illustrated in FIG. 5, the adjusting element 14 is equipped with a clamping member 50 that can be released by finger pressure and which is made up of a toggle lever 51 pivotable about an axle 52, the angled end piece 53 of this toggle lever being urged against the rail 2 by a coil spring 54. The clamping member 50 is released by exerting pressure with one's finger on the trigger button 55, and the measuring element 10 can thus be shifted along the rail 2 by the handles 56. In order to prevent pinching one—s fingers during crossover of the supporting elements, the adjusting member 14 is equipped with an angle piece 58 (FIG. 5).

The adjusting member 14 and the measuring head 15 furthermore comprise mutually opposed line marks 59 which make it possible to place the measuring head 15, by way of the adjusting member 14, against a measuring object with a reproducible measuring force and lock the head in this position after releasing the trigger button 55.

As can be seen from FIG. 1, the counter stop element 11 is likewise arranged on the rail 2 to be displaceable and can be locked in place by means of a locking lever 66. A feeler 61 is housed in the counter stop element 11 to be vertically adjustable and is secured by screws 62. At its lower end, it carries a tracer pin 64 cooperating with the tracer pin 24 for measuring an object 65 to be measured. The two supporting elements 12 and 13 are of identical design and comprise a sliding member 70 which can be locked in place on the rail 3 by means of a setscrew 75, a vertically adjustable arm 71 secured by means of screws 72, and a supporting base 74 screwed to the arm 71 and being advantageously provided with rollers 73.

As illustrated in FIG. 3, the measuring elements 10 and 11 and supporting elements 12 and 13 are dimensioned so that they can be freely guided past one another during shifting along the rails 2 and 3. This permits a great variety of application possibilities for measuring objects of differing shapes and sizes.

As can be seen from FIGS. 6, 7 and 8, it may be necessary, for example, to measure rolls having large diameters. In this case, measuring members 78, 79 must be utilized which are provided with long and large measuring jaws 80, 81, e.g. of a quarter circle shape. In this arrangement, measuring member 78 is displaceably mounted on the rail 2 equipped with scale 7, and is equipped with a capacitive pickup 82 and a window 83 for measurement display. An adjusting element 84 is connected with the measuring member 78 via a spring coupling and can be locked onto the rail 2 by means of a locking member 85. The oppositely located measuring member 79, serving as the counter stop element, is displaceably mounted on the rail 3 and can be blocked by a locking member 86. If the device is to be set to zero, or if short lengths are to be measured, then the top sections of the measuring members 78, 79 can be pushed past each other (FIGS. 7 and 8).

It is, of course, possible to displaceably arrange also supporting elements, not shown, on the rails 2 and 3, or to utilize the measuring member 78 without the adjusting member 84.

FIG. 9 illustrates a further version wherein the crossbeam 90 is made up of an H-shaped hollow profile member, e.g. of unhardened steel, four U-shaped guide elements 91 of hardened steel being attached by gluing to the four wings.

In FIG. 10, two parallel rails 95 and 96 are utilized, the guide elements of which are constituted by T-shaped profile members 97 which are countersunk into the narrow sides of the rectangular core 98. The scale 7 is accommodated in a recess 99 of the core 98. As illustrated in FIG. 11, the rails 95 and 96 are joined on both ends by mounting brackets 87 and, at certain intervals, by way of intermediate members 88 which are of such design that they permit free sliding of the measuring and supporting elements. For short measuring devices, e.g. having a length of up to 50 cm, mounting of such intermediate members 88 may be omitted.

I claim:

1. Linear measuring device of the type of a caliper rule, with elements (10, 11, 12, 13) displaceably arranged on a rail, said device comprising at least two rails (2, 3) extending in parallel to each other, the elements (10, 11, 12, 13) being displaceable on these rails substantially over the entire length of the device, and being of such a nature that elements displaceably arranged on different rails can be guided past one another at least in part in opposite directions, said elements comprising measuring elements (10, 11) and supporting elements (12, 13), the measuring elements (10, 11) being displaceably arranged on a measuring rail (2) and including a measuring head (15) with feeler (21) and measurement pickup (17) and a counter stop element (11) with feeler (61) that can be fixedly clamped onto the measuring rail (2), and the supporting elements (12, 13) being arranged so that they can be displaced and clamped fixedly in place substantially over the entire length of a supporting rail (3).

2. Device according to claim 1, characterized in that the two rails (95, 96) are joined at both ends by means of mounting members (87).

3. Device according to claim 2, characterized in that the two rails (95, 96) are joined at certain intervals by way of intermediate members (88) of such a nature that they permit free sliding of the elements.

4. Device according to claim 1, characterized in that the two rails (2, 3) are joined to each other over their entire length by way of a connecting piece.

5. Device according to claim 1, characterized in that the rails (2, 3) are built up as a composite structure, consisting of a core (8) and guide elements (9) mounted thereon.

6. Device according to claim 1, characterized in that the rails (2, 3) are of rectangular configuration.

7. Device according to claim 1, characterized in that the feelers (21, 61) are accommodated in the measuring elements (10, 11), and the supports (71) are accommodated in the supporting elements (12, 13), so that they can be displaced and can be fixedly clamped in place.

8. Device according to claim 1, characterized in that the measuring head (15) is coupled with an adjusting element (14) that is arranged on the measuring rail (2) so that it is displaceable and can be fixedly clamped in place.

9. Device according to claim 8, characterized in that the measuring head (15) is connected to the adjusting elements (14) by way of a spring coupling (36) in such a way that, with the adjusting element (14) being fixedly clamped, the measuring head can be shifted on the measuring rail (2) in opposite measuring directions against the spring force of the spring coupling (36).

10. Device according to claim 9, characterized in that the spring coupling (36) exhibits a pin (37) mounted in one of the two elements (15) and having a section (48) that is longitudinally displaceably arranged in a recess (38) of the other element (14), wherein this section (48) is surrounded by a coil spring (40) supported on both sides of a ring (45, 46), and wherein each of the two rings cooperates with a projection (43, 44) of the pin (37), as well as with a projection (45, 46) of the recess (38).

11. Device according to claim 8, characterized in that the adjusting element (14) comprises a clamping member (50) exhibiting a lever (51) urged by a spring (54) against the rail (2), this lever being liftable off the rail (2) by operating a trigger button (55).

12. Linear measuring device of the type of a caliper rule, with elements (10, 11, 12, 13) displaceably arranged on a rail, said device comprising at least two rails (2, 3) extending in parallel to each other, the elements (10, 22, 12, 13) being displaceable on these rails substantially over the entire length of the device, and being of such a nature that elements displaceably arranged on different rails can be guided past one another at least in part in opposite directions, said device including two measuring elements (78, 79) provided with jaws (80, 81), one (78) of said measuring elements being equipped with a measurement pickup (82) and being displaceably arranged on a first said rail (2) provided with a scale (7) whereas the second said measuring element (79) serving as the counter stop element is arranged on a second said rail (3) so that it can be displaced and can be fixedly clamped in place.

13. Device according to claim 12, characterized in that the two rails (95, 96) are joined at both ends by means of mounting members (87).

14. Device according to claim 13, characterized in that the two rails (95, 96) are joined at certain intervals by way of intermediate members (88) of such a nature that they permit free sliding of the elements.

15. Device according to claim 12, characterized in that the two rails (2, 3) re joined to each other over their entire length by way of a connecting piece.

16. Device according to claim 12, characterized in that the rails (2, 3) are built up as a composite structure, consisting of a core (8) and guide elements (9) mounted thereon.

17. Device according to claim 12, characterized in that the rails (2, 3) are of rectangular configuration.

18. Device according to claim 12, characterized in that the measuring head (15) is coupled with an adjusting element (14) that is arranged on the measuring rail (2) so that it is displaceable and can be fixedly clamped in place.

19. Device according to claim 18, characterized in that the measuring head (15) is connected to the adjusting element (14) by way of a spring coupling (36) in such a way that, with the adjusting element (14) being fixedly clamped, the measuring head can be shifted on the measuring rail (2) in opposite measuring directions against the spring force of the spring coupling (36).

20. Device according to claim 19, characterized in that the spring coupling (36) exhibits a pin (37) mounted in one of the two elements (15) and having a section (48) that is longitudinally displaceably arranged in a recess (38) of the other element (14), wherein this section (48) is surrounded by a coil spring (40) supported on both sides of a ring (45, 46), and wherein each of the two rings cooperates with a projection (43, 44) of the pin (37), as well as with a projection (45, 46) of the recess (38).

21. Device according to claim 18, characterized in that the adjusting element (14) comprises a clamping member (50) exhibiting a lever (51) urged by a spring (54) against the rail (2), this lever being liftable off the rail (2) by operating a trigger button (55).

* * * * *